UNITED STATES PATENT OFFICE 2,324,290

REACTION PRODUCT OF ALDEHYDES AND DIAZINE DERIVATIVES

Gaetano F. D'Alelio, Pittsfield, Mass., assignor to General Electric Company, a corporation of New York No Drawing. Application August 5, 1942,
Serial No. 453,717

20 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes, hydroxyaldehydes and aldehyde-addition products, e. g., formaldehyde, paraformaldehyde, dimethylol urea, trimethylol melamine, aldol, glycollic aldehyde, etc., and a diazine derivative corresponding to the following general formula:

I 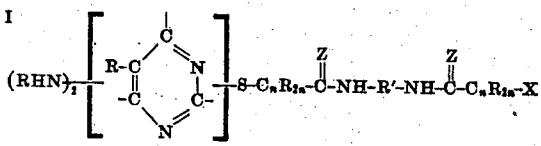

where $n$ represents an integer and is at least 1 and not more than 2, Z represents a member of the class consisting of oxygen and sulfur, R represents a member of the class consisting of hydrogen and monovalent hydrocarbon and substituted hydrocarbon radicals, more particularly halo-hydrocarbon radicals, R' represents a member of the class consisting of divalent hydrocarbon and substituted hydrocarbon radicals, more particularly halo-hydrocarbon radicals, and X represents a halogen atom, more particularly chlorine, bromine, fluorine or iodine. These compounds may be named (diamino pyrimidyl thio aliphatic-amido or aliphatic-thionoamido) (halogeno aliphatic-amido or aliphatic-thionoamido) derivatives of divalent hydrocarbons.

This application is a continuation-in-part of my copending application Serial No. 432,895, filed February 28, 1942, and assigned to the same assignee as the present invention.

Illustrative examples of monovalent radicals that R in the above formula may represent are: aliphatic (e. g., methyl, ethyl, propyl, isopropyl, butyl, secondary butyl, isobutyl, butenyl, amyl, isoamyl, hexyl, octyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylbutyl, phenylpropyl, phenylisopropyl, cinnamyl, etc.); and their homologues, as well as those groups with one or more of their hydrogen atoms substituted by, for example, a halogen. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, fluorophenyl, iodophenyl, bromotolyl, etc. Preferably R in Formula I is hydrogen. However, there also may be used in carrying the present invention into effect compounds such, for instance, as those represented by the general formulas:

II 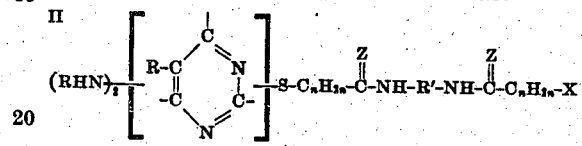

and, more particularly,

III 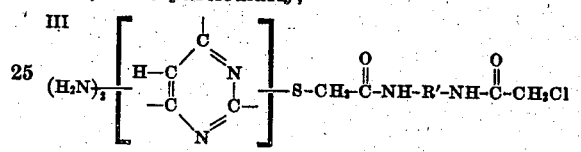

where $n$, Z, R, R' and X have the same meanings as given above with reference to Formula I.

Illustrative examples of divalent radicals that R' in the above formulas may represent are: divalent aliphatic, e. g., ethylene, propylene (trimethylene), propenylene, butylene, isobutylene, pentylene, isopentylene, etc., including divalent cycloaliphatic, e. g., cyclopentylene, cyclopentenylene, cyclohexylene, cyclohexenylene, cycloheptylene, etc.; divalent aromatic, e. g., phenylene, xenylene, naphthylene, etc.; divalent aliphatic-substituted aromatic, e. g., 2,4-tolylene, ethyl 2,5-phenylene, isopropyl 3,4-phenylene, 1-butyl 2,4-naphthylene, etc.; divalent aromatic-substituted aliphatic, e. g., phenylethylene, phenylpropylene, naphthylisobutylene, xylylene, alpha-(4-tolylene) beta'-butyl, etc.; radicals that may be classed either as divalent aliphatic-substituted aromatic or divalent aromatic-substituted aliphatic, e. g., 4, alpha-tolylene, 3, beta-phenyleneethyl, 4, alpha-xylyene, 2, gamma-phenyylenebutyl, etc.; and their homologues, as well as those divalent radicals with one or more of their hydrogen atoms replaced by a substituent, e. g., halogeno, amino, acetyl, acetoxy, carboalkoxy, alkoxy, aryloxy, hydroxy, alkyl, alkenyl, etc. Specific examples of substituted divalent radicals are chloroethylene, chloropropylene, bromo-butylene, chlorophenylene, chlorotolylene, bromophenylene, chloronaphthylene, bromonaphthylene, bromo 1,4-tolylene, chlorocyclopentylene, chlorocyclopentenylene, carbomethoxyphenylene, ethoxyphenylene, acetophenylene, acetoxyphenylene, bromocyclopentylene, aminophenylene, phenoxyphenylene, methylphenylene, (tolylene), allylphenylene, etc. Preferably R' is ethylene, phenylene or tolylene.

Instead of the diamino [(—NHR)₂] pyrimidine (1,3-diazine) derivatives represented by the above formulas, corresponding derivatives of the 1,2-diazines or of the 1,4-diazines may be employed.

The diazine derivatives that are used in carrying the present invention into effect are more fully described and are specifically claimed in my above-identified parent copending application Serial No. 432,895. As pointed out in this copending application, a method of preparing the diazine derivatives used in practicing the present invention comprises effecting reaction between a bis-(halogeno aliphatic-amido)-substituted divalent compound, more particularly a divalent hydrocarbon or halo-hydrocarbon, or a bis-(halogeno aliphatic-thionoamido)-substituted divalent compound and a mercapto diamino [(—NHR)₂] pyrimidine in the presence of a hydrohalide acceptor, e. g., an alkali-metal hydroxide, the reactants being employed in the ratio of one mol of the mercapto diamino pyrimidine per mol of the said substituted divalent compound.

Examples of diazine derivatives embraced by Formula I that may be employed in producing the new condensation products of the present invention are the (diamino pyrimidyl thio acetamido) (halogeno acetamido)-substituted aliphatic hydrocarbons, more particularly the (diamino pyrimidyl thio acetamido) (halogeno acetamido) alkanes, e. g., alpha-(4,6-diamino pyrimidyl-2 thio acetamido) beta-(chloroacetamido) ethane alpha-(2,4-diamino pyrimidyl-6 thio acetamido) beta-(chloroacetamido) ethane, the alpha-(diamino pyrimidyl thio acetothionoamido) beta-(chloroacetothionoamido) ethanes, the (diamino pyrimidyl thio acetamido) (halogeno acetamido)-substituted aromatic hydrocarbons, e. g., the (diamino pyrimidyl thio acetamido) (halogeno acetamido) benzenes, the (diamino pyrimidyl thio acetothionoamido) (halogeno acetothionoamido) benzenes, the (diamino pyrimidyl thio acetamido) (halogeno acetamido) toluenes, etc.

More specific examples of diazine derivatives that may be employed in producing my new condensation products are listed below:

(Diamino pyrimidyl thio acetamido) (chloroacetamido) propanes, including the (4,6-diamino pyrimidyl-2 thio acetamido) (chloroacetamido) propanes and the (2,6-diamino pyrimidyl-4 thio acetamido) (chloroacetamido) propanes
(Diamino pyrimidyl thio acetothionoamido) (bromoacetothionoamido) propanes
(Diamino pyrimidyl thio acetamido) (chloroacetamido) butanes
(Diamino pyrimidyl thio acetamido) (iodoacetamido) pentanes
(Diamino pyrimidyl thio acetamido) (fluoroacetamido) octanes
(Diamino pyrimidyl thio acetamido) (chloroacetamido) chlorobutanes
(Diamino pyrimidyl thio acetamido) (chloroacetamido) chlorobenzenes
(Diamino pyrimidyl thio acetamido) (bromoacetamido) toluenes
(Diamino pyrimidyl thio acetamido) (chloroacetamido) xylenes
(Diamino pyrimidyl thio acetamido) (chloroacetamido) naphthalenes
(Diamino pyrimidyl thio acetamido) (chloroacetamido) ethylbenzenes
(Diamino pyrimidyl thio acetothionoamido) (chloroacetothionoamido) cyclohexanes
(Diamino pyrimidyl thio acetamido) (chloroacetamido) butenes
(Diamino pyrimidyl thio acetamido) (chloroacetamido) cyclohexenes
(Diamino pyrimidyl thio acetamido) (bromoacetamido) bromobenzenes
(Diamino pyrimidyl thio acetamido) (chloroacetamido) chloronaphthalenes
(Diamino pyrimidyl thio acetothionoamido) (chloroacetothionoamido) hexanes
(Diamino pyrimidyl thio acetamido) (chloroacetamido) heptanes
Alpha-(diamino pyrimidyl alpha'-thio propanamido) beta-alpha''-chloropropanamido) ethane, including alpha-(4,6-diamino pyrimidyl-2 alpha'-thio propanamido) beta-(alpha''-chloro propanamido) ethane and alpha-(2,6-diamino pyrimidyl-4 alpha'-thio propanamido) beta-(alpha''-chloro propanamido) ethane
Alpha-(diamino pyrimidyl beta'-thio propanamido) beta-(beta''-bromo propanamido) ethane, including alpha-(4,6-diamino pyrimidyl-2 beta'-thio propanamido) beta-(beta''-bromo propanamido) ethane and alpha-(2,6-diamino pyrimidyl-4 beta'-thio propanamido) beta-(beta''-bromo propanamido) ethane
(Diamino pyrimidyl alpha-thio propanamido) (alpha'-chloro propanamido) propanes
(Diamino pyrimidyl beta-thio propanamido) (beta'-chloro propanamido) propanes
(Diamino pyrimidyl alpha-thio propanamido) (alpha'-bromo propanamido) butanes
(Diamino pyrimidyl beta-thio propanamido) (beta'-iodo propanamido) pentanes
(Diamino pyrimidyl alpha-thio propanamido) (alpha'-fluoro propanamido) hexanes
(Diamino pyrimidyl beta-thio propanamido) (beta'-chloro propanamido) cyclopentanes
(Diamino pyrimidyl alpha-thio propanamido) (alpha'-chloro propanamido) benzenes
(Diamino pyrimidyl beta-thio propanamido) (beta'-chloro propanamido) benzenes
(Diamino pyrimidyl alpha-thio propanamido) (alpha'-chloro propanamido) toluenes
(Diamino pyrimidyl beta-thio propanamido) (beta'-bromo propanamido) toluenes
(Diamino pyrimidyl alpha-thio propanamido) (alpha'-iodo propanamido) xylenes
(Diamino pyrimidyl beta-thio propanamido) (beta'-chloro propanamido) xylenes
(Diamino pyrimidyl alpha-thio propanamido) (alpha'-fluoro propanamido) ethylbenzenes
(Diamino pyrimidyl beta-thio propanamido) (beta'-chloro propanamido) naphthalenes
(Diamino pyrimidyl alpha-thio propanamido) (alpha'-chloro propanamido) chloronaphthalenes
(Diamino pyrimidyl beta-thio propanamido) (beta'-bromo propanamido) bromobenzenes
(Diamino pyrimidyl alpha-thio propanamido) (alpha'-chloro propanamido) chlorobutanes (Diamino pyrimidyl beta-thio propanamido) (beta'-chloro propanamido) anthracenes (Diamino pyrimidyl alpha-thio propanthionoamido) (alpha'-chloro propanthionoamido) benzenes (Diamino pyrimidyl beta-thio propanthionoamido) (beta'-bromo propanthionoamido) toluenes Alpha-(4,6-di-[methylamino] 5-methyl pyrimidyl-2 thio acetamido) beta-(chloroacetamido) ethane (4-chloroethylamino 6-methylamino pyrimidyl-2 beta-thio propanamido) (beta'-iodo propanamido) butanes (2-isopentylamino 4-chlorophenylamino pyrimidyl-6 thio ethyl xylyl acetamido) (ethyl xylyl chloroacetamido) cyclohexanes (2-cyclohexylamino 4-isobutylamino pyrimidyl-6 beta-thio propanamido) (beta'-bromo propanamido) benzenes (4-xylidino 5-naphthyl 6-ethylanilino pyrimidyl-2 thio bromocyclopentyl acetamido) (bromocyclopentyl chloro acetamido) naphthalenes 4-(4'-benzylamino 5'-benzyl 6'-isopropylanilino pyrimidyl-2' thio cyclohexenyl acetothionoamido) 2-(cyclohexenyl bromo acetothionoamido) chlorotoluene 5-(4'-cyclopentenylamino 5'-[2''-butenyl] 6'-phenethylamino pyrimidyl-2' thio benzyl acetamido) 2-(benzyl chloro acetamido) ethylbenzene (4-chlorocyclohexylamino 5-phenylisopropyl 6-amino pyrimidyl-2 thio acetamido) (chloroacetamido) diphenylmethanes Alpha-(4,6-diamino 5-phenylpropyl pyrimidyl-2 thio chloropropyl acetamido) beta-(chloropropyl bromo acetamido) alpha-phenylethane Alpha-(4-chlorobenzylamino 5-chlorobutyl 6-bromoethylamino pyrimidyl-2 thio acetamido) gamma-(chloroacetamido) alpha-phenylpropane It will be understood, of course, by those skilled in the art that, in those compounds listed above that are generically named, the described substituent groupings may be attached to any two positions of the divalent compound represented by R' in Formula I. It also will be understood that the expression "diamino pyrimidyl" includes within its meaning both the 4,6-diamino pyrimidyl-2 and the 2,6-diamino pyrimidyl-4 (2,4-diamino pyrimidyl-6) derivatives.

The present invention is based on my discovery that new and valuable materials of particular utility in the plastics and coating arts can be produced by effecting reaction between ingredients comprising essentially an aldehyde, including polymeric aldehydes, hydroxyaldehydes and aldehyde-addition products, and a diazine derivative of the kind embraced by Formula I, numerous examples of which have been given above and in my above-identified parent copending application Serial No. 432,895.

It has been suggested heretofore that resins be made by condensing an aldehyde with a diamino pyrimidine having attached to one or both of the remaining carbon atoms of the pyrimidine nucleus a thioether grouping, but such resins are not entirely satisfactory for use in many applications, for instance in the production of molding compounds having a high plastic flow during molding combined with a rapid cure to an insoluble, infusible state. Surprisingly it was found that the heat-curable resinous condensation products of this invention and molding compositions made therefrom show excellent flow characteristics during a short curing cycle. This is a property that is particularly desirable in a thermosetting resin and molding compound. The molded articles have a high dielectric strength and excellent resistance to arcing. They have a good surface finish and, in general, are better than the ordinary urea-formaldehyde resins in their resistance to water. The cured resins have a high resistance to heat and abrasion and, therefore, are especially suitable for use where optimum heat- and abrasion-resistance are properties of primary importance.

In practicing my invention the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, I may use an alkaline substance such as sodium, potassium or calcium hydroxides, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the diazine derivative may be carried out in the presence of solvents or diluents, fillers, other natural or synthetic resinous bodies, or while admixed with other materials that also can react with the aldehydic reactant or with the diazine derivative, e. g., ketones, urea (NH₂CONH₂), thiourea, selenourea, iminourea (guanidine), substituted ureas, thioureas, selenoureas and iminoureas, e. g., urea derivatives such as mentioned in my Patent No. 2,285,418, issued June 9, 1942, page 1, column 1, lines 41-49; monocarboxylic and polycarboxylic acids and polyamides of polycarboxylic acids, e. g., acetamide, halogenated acetamides (e. g., a chlorinated acetamide), maleic monoamide, malonic monoamide, itaconic diamide, succinic diamide, phthalic diamide, the monoamide, diamide and triamide of tricarballylic acid, etc.; aldehyde-reactable diazines other than the diazine derivatives constituting the primary components of the resins of the present invention; aminotriazines, e. g., melamine, ammeline, ammelide, melem, melon, melam, numerous other examples being given in various copending applications of mine, for instance in application Serial No. 377,524, filed February 5, 1941, and in applications referred to in said copending application; phenol and substituted phenols, e. g., the cresols, the xylenols, the tertiary alkyl phenols and numerous other phenols such as mentioned in my Patent No. 2,239,441, issued April 22, 1941; monohydric and polyhydric alcohols, e. g., butyl alcohol, amyl alcohol, isoamyl alcohol, ethylene glycol, glycerine, polyvinyl alcohol, etc.; amines, including aromatic amines, e. g., aniline, etc.; and the like.

The modifying reactants may be incorporated with the diazine derivative and the aldehyde by mixing all the reactants and effecting condensation therebetween or by various permutations of reactants as described, for example, in my Patent No. 2,281,559, issued May 5, 1942, with particular reference to reactions involving a non-haloacylated urea, a halogenated acylated urea and an aliphatic aldehyde (page 2, column 1, lines 49–69). For instance, I may form a partial condensation product of ingredients comprising (1) urea or melamine or urea and melamine, (2) a diazine derivative of the kind embraced by Formula I, for example a (diamino pyrimidyl thio acetamido) (halogeno acetamido)-substituted aliphatic hydrocarbon, more paricularly a (diamino pyrimidyl thio acetamido) (halogeno acetamido) alkane such, for instance, as alpha-(4,6-diamino pyrimidyl-2 thio acetamido) beta-(chloroacetamido) ethane, alpha-(2,6-diamino pyrimidyl-4 thio acetamido) beta-(chlorocetamido) ethane, etc., a (diamino pyrimidyl thio acetamido) (halogeno acetamido)-substituted aromatic hydrocarbon, e. g., a (diamino pyrimidyl thio acetamido) (halogeno acetamido) benzene, a (diamino pyrimidyl thio acetamido) halogeno acetamido) toluene, etc., and (3) an aldehyde, including polymeric aldehydes, hydroxyaldehydes and aldehyde-addition products, for instance formaldehyde, paraformaldehyde, glyceraldehyde, dimethylol urea, a polymethylol melamine, e. g., hexamethylol melamine, etc. Thereafter I may effect reaction between this partial condensation product and, for example, a curing reactant, specifically a chlorinated acetamide, to obtain a heat-curable composition.

Some of the condensation products of this invention are thermoplastic materials even at an advanced stage of condensation while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting condensation products, alone or mixed with fillers, pigments, dyes, lubricants, plasticizers, curing agents, etc., may be used, for example, in the production of molding compositions.

The liquid intermediate condensation products of this invention may be concentrated or diluted further by the removal or addition of volatile solvents to form liquid coating compositions of adjusted viscosity and concentrations. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

*Example 1*

| | Parts |
|---|---|
| Alpha-(4,6-diamino pyrimidyl-2 thio acetamido) beta-(chloroacetamido) ethane | 31.9 |
| Aqueous formaldehyde (approx. 37.1% HCHO) | 65.6 |
| Aqueous ammonia (approx. 28% $NH_3$) | 0.6 |
| Aqueous solution of sodium hydroxide (0.5 N) | 0.5 | were heated together under reflux at the boiling temperature of the mass for 15 minutes, yielding a clear, resinous syrup. This syrup was mixed while hot with 33 parts alpha cellulose in flock form and 0.2 part of a mold lubricant, specifically zinc stearate. The resulting wet molding composition was divided into two equal parts. To one portion was added 1.3 parts chloroacetamide (monochloroacetamide) and the mixture then was ground in a mortar until a homogeneous mass resulted. Both portions of molding compound were now dried at room temperature until sufficient moisture had been removed to provide a material that could be molded satisfactorily. Samples of the dried and ground molding compositions were molded at 140° C. under a pressure of 6,750 pounds per square inch. The sample containing the chloroacetamide was molded for 5 minutes and the other sample, for 7 minutes. In both cases well-cured molded pieces having well-knit and homogeneous structures were obtained. Both pieces showed good resistance to water as evidenced by the fact that, when immersed in boiling water for 15 minutes followed by immersion in cold water for 5 minutes, the molded piece made from the chlorocetamide-containing molding compound absorbed only 4.2% by weight of water while the other molded piece absorbed only 3.9% by weight of water. (When similarly tested for water resistance, molded articles made from the ordinary urea-formaldehyde molding compositions absorb about 5–7% by weight of water.) The molding compounds showed very good plastic flow during molding as indicated by the amount of flash on the molded piece.

*Example 2*

| | Parts |
|---|---|
| Alpha-(4,6-diamino pyrimidyl-2 thio acetamido) beta-(chloroacetamido) ethane | 31.9 |
| Aqueous formaldehyde (approx. 37.1% HCHO) | 150.0 |
| Aqueous ammonia (approx. 28% $NH_3$) | 0.6 |
| Aqueous solution of sodium hydroxide (0.5 N) | 0.5 | were placed in a flask which, in turn, was shaken at room temperature for approximately 16 hours. The reaction product was in the form of a clear, light pink solution that was quite viscous. When a sample of this syrupy condensation product was heated on a 140° C. hot plate, it bodied slowly to a flexible, infusible sheet that showed good plastic flow during curing to the fusible state.

Example 3

| | Parts |
|---|---|
| Alpha-(4,6-diamino pyrimidyl-2 thio acetamido) beta-(chloroacetamido) ethane_ | 31.9 |
| Urea | 30.0 |
| Aqueous formaldehyde (approx. 37.1% HCHO) | 123.0 |
| Aqueous ammonia (approx. 28% NH₃) | 3.5 |
| Aqueous solution of sodium hydroxide (0.5 N) | 1.6 | were heated together under reflux at the boiling temperature of the mass for 30 minutes, yielding a clear, resinous syrup. This syrup was mixed with 66 parts alpha cellulose and 0.2 part zinc stearate to form a molding compound. The wet molding composition was dried at room temperature for about 16 hours. A well-cured molded piece having good water resistance and a well-knit and homogeneous structure was obtained by molding a sample of the dried and ground molding compound for 7 minutes at 140° C. under a pressure of 6,750 pounds per square inch. The molding composition showed excellent plastic flow during molding.

Example 4

Same as Example 3 with the exception that the mixed ingredients were heated together under reflux for only 25 minutes, after which 2 parts chloroacetamide were added and refluxing was continued for an additional 5 minutes. The chloroacetamide functions as a curing reactant. A well-cured molded piece having a well-knit and homogeneous structure was obtained. Its water resistance was somewhat better than that of the molded article of Example 3. It absorbed only 2.8% by weight of water when tested for its water resistance as described under Example 1.

Instead of using chloroacetamide as above described, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloracetamide (e. g., di- and tri-chloroacetamides, chloroacetonitriles, alpha, beta-dibromopropionitrile, aminoacetamide hydrochloride, ethylene diamine monohydrochloride, the ethanolamine hydrochlorides, nitrourea, chloroacetyl urea, chloroacetone, glycine, sulfamic acid, citric diamide, phenacyl chloride, etc.). Other examples of curing reactants that may be employed to accelerate or to effect the curing of the thermosetting or potentially thermosetting resins of this and other examples are given in various copending applications of mine, for instance in copending applications Serial No. 346,962, filed July 23, 1940, and Serial No. 354,395, filed August 27, 1940, both of which applications are assigned to the same assignee as the present invention.

Example 5

| | Parts |
|---|---|
| Urea | 60.0 |
| Alpha-(4,6-diamino pyrimidyl-2 thio acetamido) beta-(chloroacetamido) ethane_ | 8.0 |
| Aqueous formaldehyde (approx. 37.1% HCHO) | 134.0 |
| Aqueous ammonia (approx. 28% NH₃) | 3.5 |
| Aqueous solution of sodium hydroxide (0.5 N) | 1.6 | were heated together under reflux at the boiling temperature of the mass for 15 minutes, yielding a syrupy intercondensation product that bodied to a potentially thermosetting resin when a sample of it was heated on a 140° C. hot plate. Chloroacetamide, glycine, sulfamic acid, phthalic anhydride and other curing agents such as mentioned under Example 4 accelerated the conversion of the resin to a cured or insoluble and infusible state.

Example 6

| | Parts |
|---|---|
| Alpha-(4,6-diamino pyrimidyl-2 thio acetamido) beta-(chloroacetamido) ethane__ | 31.9 |
| Melamine | 63.0 |
| Aqueous formaldehyde (approx. 37.1% HCHO) | 157.0 |
| Aqueous ammonia (approx. 28% NH₃) | 4.0 |
| Aqueous solution of sodium hydroxide (0.5 N) | 3.0 |
| Chloroacetamide | 1.8 |

All of the above ingredients with the exception of the chloroacetamide were heated together under reflux at the boiling temperature of the mass for 10 minutes, yielding a clear, syrupy condensation product. This syrup was mixed with 86 parts alpha cellulose, 0.4 part zinc stearate and the above-stated amount of chloroacetamide to form a molding compound. The wet molding composition was dried at room temperature for about 16 hours. A sample of the dried and ground molding compound was molded for 5 minutes at 140° C. under a pressure of 6,750 pounds per square inch. The molded piece was removed hot from the mold and did not warp or become distorted upon cooling to room temperature. It was well cured throughout and had a well-knit and homogeneous structure. It had excellent resistance to water as shown by the fact that it absorbed only 0.65% by weight of water when tested for its water resistance as described under Example 1. The molding compound showed excellent flow during molding as evidenced by the amount of flesh on the molded piece.

Example 7

| | Parts |
|---|---|
| Alpha-(4,6-diamino pyrimidyl-2 thio acetamido) beta-(chloroacetamido) ethane__ | 31.9 |
| Dimethylol urea (commercial grade containing approx. 11% by weight of water) | 60.0 |
| Aqueous formaldehyde (approx. 37.1% HCHO) | 35.0 |
| Aqueous ammonia (approx. 28% NH₃) | 4.3 |
| Aqueous solution of sodium hydroxide (0.5 N) | 2.2 |
| Chloroacetamide | 2.0 |
| Water | 45.0 | were heated together under reflux at the boiling temperature of the mass for 20 minutes. The resulting resinous syrup was mixed with 60 parts alpha cellulose and 0.3 part zinc stearate to form a molding compound. The wet molding composition was dried at room temperature until sufficient moisture had been removed to provide a material that could be molded satisfactorily. A well-molded piece was obtained by molding a sample of the dried and ground molding compound for 5 minutes at 140° C. under a pressure of 6,750 pounds per square inch.

Example 8

| | Parts |
|---|---|
| Alpha-(4,6-diamino pyrimidyl-2 thio acetamido) beta-(chloroacetamido) ethane | 31.9 |
| Trimethylol melamine (crystalline) | 86.0 |
| Aqueous formaldehyde (approx. 37.1% HCHO) | 35.0 |
| Aqueous ammonia (approx. 28% NH₃) | 3.0 |
| Aqueous solution of sodium hydroxide (0.5 N) | 2.5 |
| Chloroacetamide | 1.5 |
| Water | 60.8 |

All of the above ingredients with the exception of the chloroacetamide were heated together under reflux at the boiling temperature of the mass for 8 minutes. A molding composition was made from the resulting resinous syrup by mixing therewith 75 parts alpha cellulose, 0.4 part zinc stearate and the above-stated amount of chloroacetamide. The wet molding compound was dried as described under Example 7. A well-cured molded piece was obtained by molding a sample of the dried and ground molding compound for 5 minutes at 140° C. under a pressure of 6,750 pounds per square inch. It had a well-knit and homogeneous structure and excellent resistance to water as shown by the fact that it absorbed only 0.46% by weight of water when tested for its water resistance as described under Example 1. The plastic flow of the molding compound during molding was very good.

Example 9

| | Parts |
|---|---|
| Alpha-4,6-diamino pyrimidyl-2 thio acetamido) beta-(chloroacetamido) ethane | 15.9 |
| Acrolein | 28.0 |
| Aqueous solution of sodium hydroxide (0.5 N) | 1.0 |
| Water | 20.0 |

The above ingredients were mixed together, the acrolein being added last. The mixture was heated gently under reflux at boiling temperature for 5 minutes, yielding a heat-curable resinous syrup that slowly hardened to an infusible state when a sample of the syrup was heated on a 140° C. hot plate. The resin showed excellent plasticity during its conversion under heat to an infusible state. The product of this example would be suitable for use in the preparation of molding compounds.

Example 10

| | Parts |
|---|---|
| Alpha-(4,6-diamino pyrimidyl-2 thio acetamido) beta-(chloroacetamido) ethane | 15.9 |
| Furfural | 48.0 |
| Aqueous ammonia (approx. 28% NH₃) | 1.0 |
| Aqueous solution of sodium hydroxide (0.5 N) | 1.0 | were heated together under reflux at the boiling temperature of the mass for 14 minutes, yielding a dark brown, resinous syrup. This syrup formed a hard, well-cohered, infusible sheet when a sample of it was heated on a 140° C. hot plate. The resinous material of this example may be used in the production of molding compounds or as a modifier of synthetic resins of inadequate flow characteristics to improve their plasticity.

Example 11

| | Parts |
|---|---|
| Alpha-(4,6-diamino pyrimidyl-2 thio acetamido) beta-(chloroacetamido) ethane | 15.9 |
| Butyl alcohol | 37.0 |
| Aqueous formaldehyde (approx. 37.1% HCHO) | 40.5 |
| Aqueous ammonia (approx. 28% NH₃) | 1.0 |
| Aqueous solution of sodium hydroxide (0.5 N) | 1.0 | were heated together under reflux at the boiling temperature of the mass for 15 minutes, yielding a clear, syrupy intercondensation product. This syrup was dehydrated by heating on a steam plate. The dehydrated syrup was soluble in dioxane, butyl alcohol, ethylene glycol, ethylene glycol monoethyl ether and other organic solvents. Glass plates were coated with samples of the dehydrated syrup and the coated plates were baked for several hours at 70° C. The baked coatings were hard, transparent, water-white, water-resistant and smooth, and adhered tightly to the glass surface. The solubility and film-forming characteristics of the resinous composition of this example make it especially suitable for use in the preparation of coating and impregnating compositions. For example, it may be used in the production of spirit and baking varnishes. It may be employed as a modifier of varnishes of the aminoplast and alkyd-resin types.

Example 12

| | Parts |
|---|---|
| Alpha-(4,6-diamino pyrimidyl-2 thio acetamido) beta-(chloroacetamido) ethane | 15.9 |
| Diethyl malonate | 8.0 |
| Aqueous formaldehyde (approx. 37.1% HCHO) | 81.0 |
| Aqueous ammonia (approx. 28% NH₃) | 1.0 |
| Aqueous solution of sodium hydroxide (0.5 N) | 1.0 | were heated together under reflux at the boiling temperature of the mass for 15 minutes, yielding a clear, resinous syrup. This syrup bodied to a thermoplastic resin when a sample of it was heated on a 140° C. hot plate.

Example 13

| | Parts |
|---|---|
| Alpha-(4,6-diamino pyrimidyl-2 thio acetamido) beta-(chloroacetamido) ethane | 15.9 |
| Acetamide | 30.0 |
| Aqueous formaldehyde (approx. 37.1% HCHO) | 81.0 |
| Aqueous ammonia (approx. 28% NH₃) | 1.0 |
| Aqueous solution of sodium hydroxide (0.5 N) | 1.0 |

All of the above ingredients were heated together under reflux at the boiling temperature of the mass for 20 minutes. This resulted in the production of a clear, resinous syrup that bodied to a thermoplastic resin when a sample of it was heated on a 140° C. hot plate.

The resinous compositions of this example and of the preceding example are suitable for use as modifiers of less plastic resins to improve their flow or plasticity characteristics.

Example 14

| | Parts |
|---|---|
| Alpha-(4,6-diamino pyrimidyl-2 thio acetamido) beta-(chloroacetamido) ethane | 15.9 |
| Glycerine | 4.6 |
| Aqueous formaldehyde (approx. 37.1% HCHO) | 81.0 |
| Aqueous ammonia (approx. 28% NH₃) | 1.0 |
| Aqueous solution of sodium hydroxide (0.5 N) | 1.0 | were heated together under reflux at the boiling temperature of the mass for 15 minutes, yielding a clear, resinous syrup. This syrup was dehydrated by heating it on a hot plate. The dehydrated syrup was soluble in dioxane, ethylene glycol, ethylene glycol monoethyl ether, butyl alcohol and other organic solvents. A glass plate was coated with a sample of the dehydrated syrup. The coated plate was baked for several hours at 70° C. A hard, transparent, water-white, water-resistant, smooth, tightly adhering, baked film was formed on the plate. The solubility and film-forming characteristics of the resinous composition of this example make it particularly suitable for use in the preparation of coating and impregnating compositions.

Example 15

| | Parts |
|---|---|
| Alpha-(4,6-diamino pyrimidyl-2 thio acetamido) beta-(chloroacetamido) ethane | 15.9 |
| Polyvinyl alcohol | 2.2 |
| Aqueous formaldehyde (approx. 37.1% HCHO) | 81.0 |
| Aqueous ammonia (approx. 28% NH₃) | 1.0 |
| Aqueous solution of sodium hydroxide (0.5 N) | 1.0 |
| Water | 20.0 | were heated together under reflux at the boiling temperature of the mass for 10 minutes, yielding a resinous syrup that bodied to a rubbery, semi-infusible state when a sample of it was heated on a 140° C. hot plate in the absence of a curing agent. The addition of chloroacetamide, glycine, sulfamic acid or other curing agent such as mentioned under Example 4 to the resinous syrup, followed by heating on a 140° C. hot plate, resulted in the curing of the syrup to an infusible resinous mass. The resinous composition of this example is suitable for use in the production of molding compounds. It also may be used in the preparation of various coating and impregnating compositions.

It will be understood, of course, by those skilled in the art that the reaction between the components may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of Examples 1 and 3 to 15, inclusive, at boiling temperature as mentioned in the individual examples, the reaction between the components may be carried out at lower temperatures, for instance at temperatures ranging from room temperature up to the boiling temperature of the mass using longer reaction periods and, in some cases, stronger catalysts and higher catalyst concentrations.

It also will be understood by those skilled in the art that my invention is not limited to condensation products obtained by reaction of ingredients comprising an aldehyde and the specific diazine compound named in the above illustrative examples. Thus, instead of alpha-(4,6-diamino pyrimidyl-2 thio acetamido) beta-(chloroacetamido) ethane, I may use, for example, the corresponding fluoro, iodo or bromo derivatives, an alpha-(2,6-diamino pyrimidyl-4 thio acetamido) beta-(halogeno acetamido) ethane or other (diamino pyrimidyl thio acetamido) (halogeno acetamido) alkane or alkene, a (diamino pyrimidyl thio acetamido) (halogeno acetamido) benzene, toluene or other divalent aromatic hydrocarbon, or any other diazine derivative (or mixture thereof) of the kind embraced by Formula I, numerous examples of which have been given above and in my copending application Serial No. 432,895.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, methacrolein, crotonaldehyde, octaldehyde, benzaldehyde, furfural, etc., mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives of urea, thiourea, selenourea and iminourea and of substituted ureas, thioureas, selenoureas and iminoureas, mono- and poly-(N-carbinol) derivatives of amides of poly-carboxylic acids, e. g., maleic, itaconic, fumaric, adipic, malonic, succinic, citric, phthalic, etc., mono- and poly-(N-carbinol) derivatives of the aminotriazoles, of the aminotriazines, etc. Particularly good results are obtained with active methylene-containing bodies such as a methylol urea, more particularly mono- and di-methylol ureas, and a methylol aminotriazine, e. g., monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the diazine derivative may be varied over a wide range, but ordinarily the reactants are employed in an amount corresponding to at least one mol of the aldehyde, specifically formaldehyde, for each mol of the diazine derivative. Thus, I may use, for example, from 1 to 7 or 8 or more mols of an aldehyde for each mol of diazine derivative. Good results are obtained in manufacturing thermosetting resinous compositions using from about 2 to 4 mols aldehyde, specifically formaldehyde, for each mol of diazine derivative. When the aldehyde is available for reaction in the form of an alkylol derivative, more particularly a methylol derivative such, for instance, as dimethylol, urea, trimethylol melamine, etc., then higher amounts of such aldehyde-addition products are employed, for instance from 2 or 3 up to 12 or 15 or more mols of such alkylol derivatives for each mol of the diazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents I may use, for instance, monohydric alcohols such as ethyl, propyl isopropyl, isobutyl, hexyl, etc., alcohols, polyhydric alcohols such as diethylene glycol, triethylene glycol, pentaerythritol, etc.; alcohol-ethers, e. g., ethylene glycol monomethyl ether, ethylene glycol monoethyl ether, ethylene glycol monobutyl ether, ethylene glycol, monophenyl ether, diethylene glycol monomethyl ether, diethylene glycol monoethyl ether, diethylene glycol monobutyl ether, etc.; amides such as formamide, stearamide, acrylamide, benzene sulfonamide, toluene sulfonamides, adipic diamide, phthalic diamide, etc.; amines, e. g., ethylene diamine, phenylene diamine, etc.; phenol and substituted phenols, including aminophenols, etc.; ketones, including halogenated ketones; nitriles, including halogenated nitriles, e. g., acrylonitrile, methacrylonitrile, succinonitrile, chloroacetonitriles, etc.; acylated ureas, including halogenated acylated ureas of the kind described, for example, in my Patent No. 2,281,559, issued May 5, 1942; and others.

The modifying bodies also may take the form of high molecular weight bodies with or without resinous characteristics, for example, hydrolyzed wood products, formalized cellulose derivatives, lignin, protein-aldehyde condensation products, aminotriazole-aldehyde condensation products, aminotriazine-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a diazine derivative of the kind embraced by Formula I and an aldehyde, specifically formaldehyde, I may cause an aldehyde to condense with a salt (organic or inorganic) of the diazine derivative or with a mixture of the diazine derivative and a salt thereof. Examples of organic and inorganic acids that may be used in the preparation of such salts are hydrochloric, sulfuric, phosphoric, boric, acetic, chloroacetic, propionic, butyric, valeric, acrylic, polyacrylic, oxalic, methacrylic, polymethacrylic, malonic, succinic, adipic, malic, maleic, fumaric, benzoic, salicylic, phthalic, camphoric, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire and baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They may be used for treating cotton, linen and other cellulosic materials in sheet or other form. They also may be employed as impregnants for electrical coils and for other electrically insulating applications.

What I claim as new and desire to secure by Letters Patent of the United States is:

1. A composition of matter comprising the product of reaction of ingredients comprising an aldehyde and a compound corresponding to the general formula

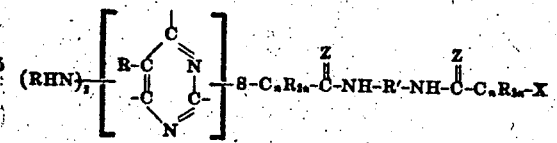

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, R' represents a member of the class consisting of divalent hydrocarbon and halo-hydrocarbon radicals, and X represents a halogen atom.

2. A composition as in claim 1 wherein the aldehyde is formaldehyde.

3. A composition as in claim 1 wherein the reaction product is an alkaline-catalyzed reaction product of the stated components.

4. A composition as in claim 1 wherein R represents a hydrogen atom.

5. A composition as in claim 1 wherein the reaction product is an alcohol-modified reaction product of the stated components.

6. A composition of matter comprising the product of reaction of ingredients comprising an aldehyde and a compound corresponding to the general formula

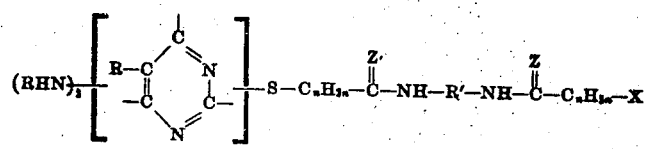

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, R' represents a member of the class consisting of divalent hydrocarbon and halo-hydrocarbon radicals; and X represents a halogen atom.

7. A heat-curable resinous composition comprising a heat-convertible condensation product of ingredients comprising formaldehyde and a compound corresponding to the general formula

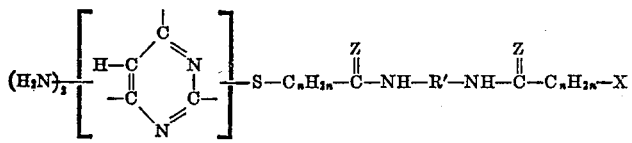

where $n$ represents an integer and is at least 1 and not more than 2, Z represents a member of the class consisting of oxygen and sulfur, R' represents a member of the class consisting of divalent hydrocarbon and halo-hydrocarbon radicals, and X represents a halogen atom.

8. A product comprising the cured resinous composition of claim 7.

9. A composition as in claim 7 wherein Z represents oxygen and X represents chlorine.

10. A composition comprising a condensation product of ingredients comprising an aldehyde and a (diamino pyrimidyl thio acetamido) (halogeno acetamido)-substituted aliphatic hydrocarbon.

11. A composition comprising a condensation product of ingredients comprising an aldehyde and a (diamino pyrimidyl thio acetamido) (chloroacetamido) alkane.

12. A resinous composition comprising the product of reaction of ingredients comprising formaldehyde and alpha-(4,6-diamino pyrimidyl-2 thio acetamido) beta-(chloroacetamido) ethane.

13. A composition comprising a condensation product of ingredients comprising an aldehyde and a (diamino pyrimidyl thio acetamido) (halogeno acetamido)-substituted aromatic hydrocarbon.

14. A composition of matter comprising the product of reaction of ingredients comprising a urea, an aldehyde and a compound corresponding to the general formula

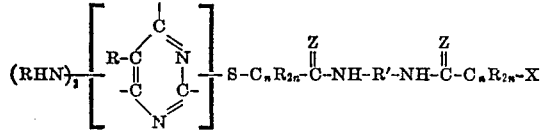

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, R' represents a member of the class consisting of divalent hydrocarbon and halo-hydrocarbon radicals, and X represents a halogen atom.

15. A composition as in claim 14 wherein R represents hydrogen, the aldehyde is formaldehyde and the urea component is the compound corresponding to the general formula $NH_2CONH_2$.

16. A composition comprising the resinous product of reaction of ingredients comprising urea, formaldehyde and alpha-(4,6-diamino pyrimidyl-2 thio acetamido) beta-(chloro-acetamido) ethane.

17. A resinous composition comprising the product of reaction of ingredients comprising dimethylol urea and alpha-(4,6-diamino pyrimidyl-2 thio acetamido) beta-(chloro-acetamido) ethane.

18. A composition of matter comprising the product of reaction of ingredients comprising an aminotriazine, an aldehyde and a compound corresponding to the general formula

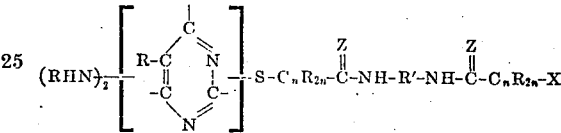

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, R' represents a member of the class consisting of divalent hydrocarbon and halo-hydrocarbon radicals, and X represents a halogen atom.

19. A resinous composition comprising the product of reaction of ingredients comprising melamine, formaldehyde and an alpha-(diamino pyrimidyl thio acetamido) beta-(chloro-acetamido) ethane.

20. The method of preparing new synthetic compositions which comprises effecting reaction between ingredients comprising an aldehyde and a compound corresponding to the general formula

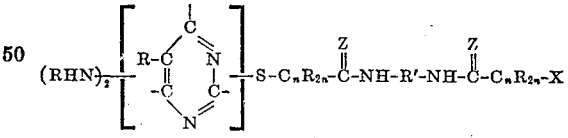

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, R' represents a member of the class consisting of divalent hydrocarbon and halo-hydrocarbon radicals, and X represents a halogen atom.

GAETANO F. D'ALELIO.

CERTIFICATE OF CORRECTION.

Patent No. 2,324,290. July 13, 1943.

GAETANO F. D'ALELIO.

It is hereby certified that error appears in the printed specification of the above numbered patent requiring correction as follows: Page 1, second column, line 49, for "4, alpha-xylyene" read --4, alpha-xylylene--; line 50, for "phenyylenebutyl" read --phenylenebutyl--; page 2, first column, line 46, after "ethane" insert a comma; and second column, line 28, for "beta-alpha''" read --beta-(alpha''--; page 3, first column, line 37, after "acetamido" insert a closing parenthesis; and second column, line 66, before "mono-" insert --monoamides of--; page 4, first column, line 31, for "paricularly" read --particularly--; line 36, for "(chlorocetamido)" read --(chloroacetamido)--; page 4, first column, line 41, before "halogeno" insert an opening parenthesis; and second column, line 20, for "hydoxide" read --hydroxide--; line 48, for "chlorocetamide" read --chloroacetamide--; and line 75, for "fusible" read --infusible--; page 5, first column, line 48-49, for the word "monochloracetamide" read --monochloroacetamide--; line 69-70, for "acetamide" read --acetamido--; and second column, line 45, for "flesh" read --flash--; page 6, first column, line 38, for "Alpha-4,6-diamino" read --Alpha-(4,6-diamino--; page 8, first column, line 9-10, after "propyl" insert a comma; and second column, line 2-3, for "thermaplastic" read --thermoplastic--; and that the said Letters Patent should be read with this correction therein that the same may conform to the record of the case in the Patent Office.

Signed and sealed this 21st day of September, A. D. 1943.

Henry Van Arsdale,
Acting Commissioner of Patents.

(Seal)